Feb. 16, 1926.
C. W. McKINLEY
1,572,943
TRACTOR
Filed Nov. 22, 1920     9 Sheets-Sheet 3
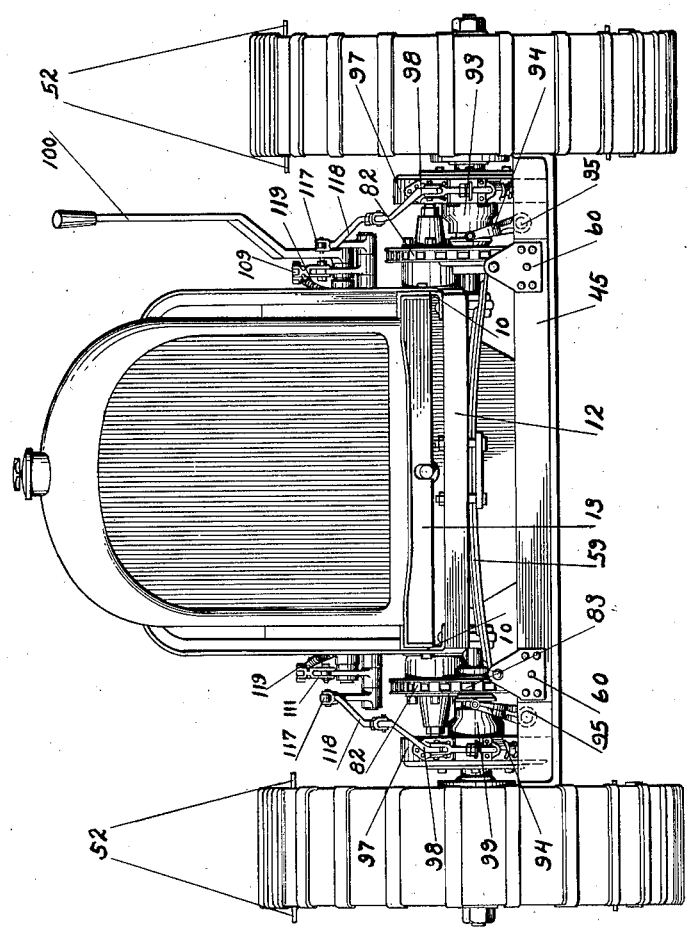
INVENTOR.
Charles W. McKinley
BY
ATTORNEY

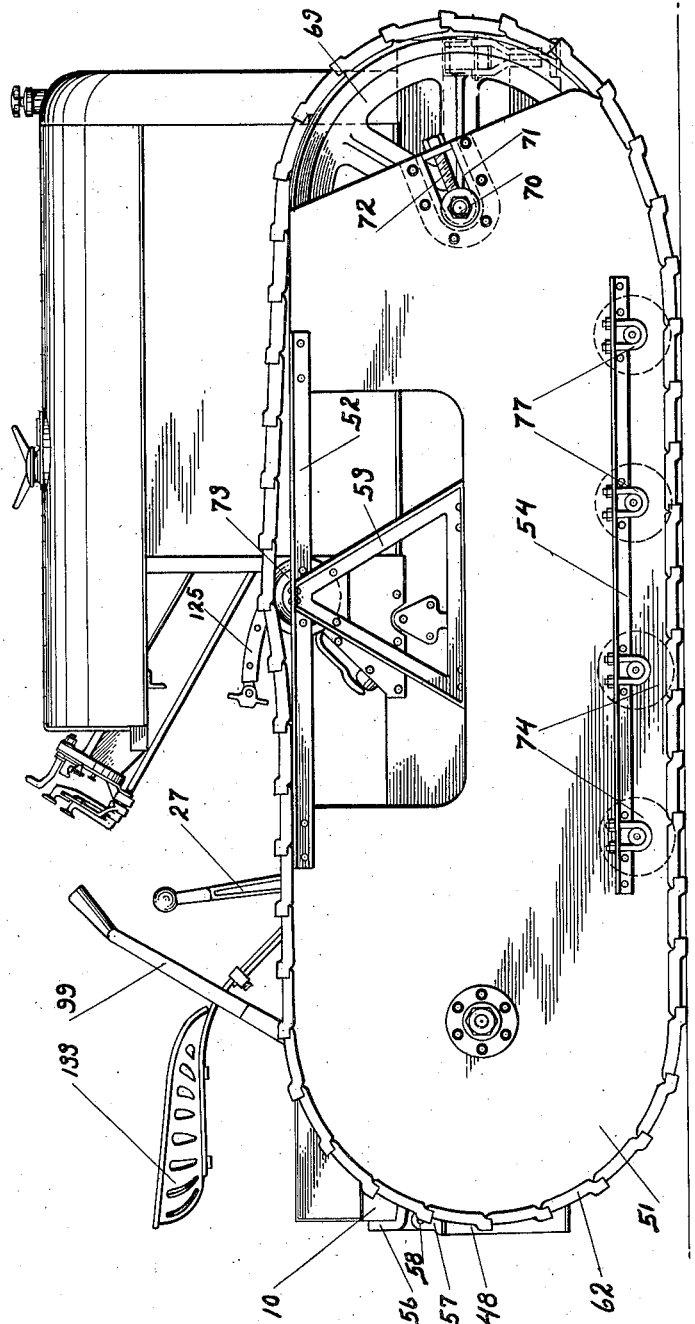

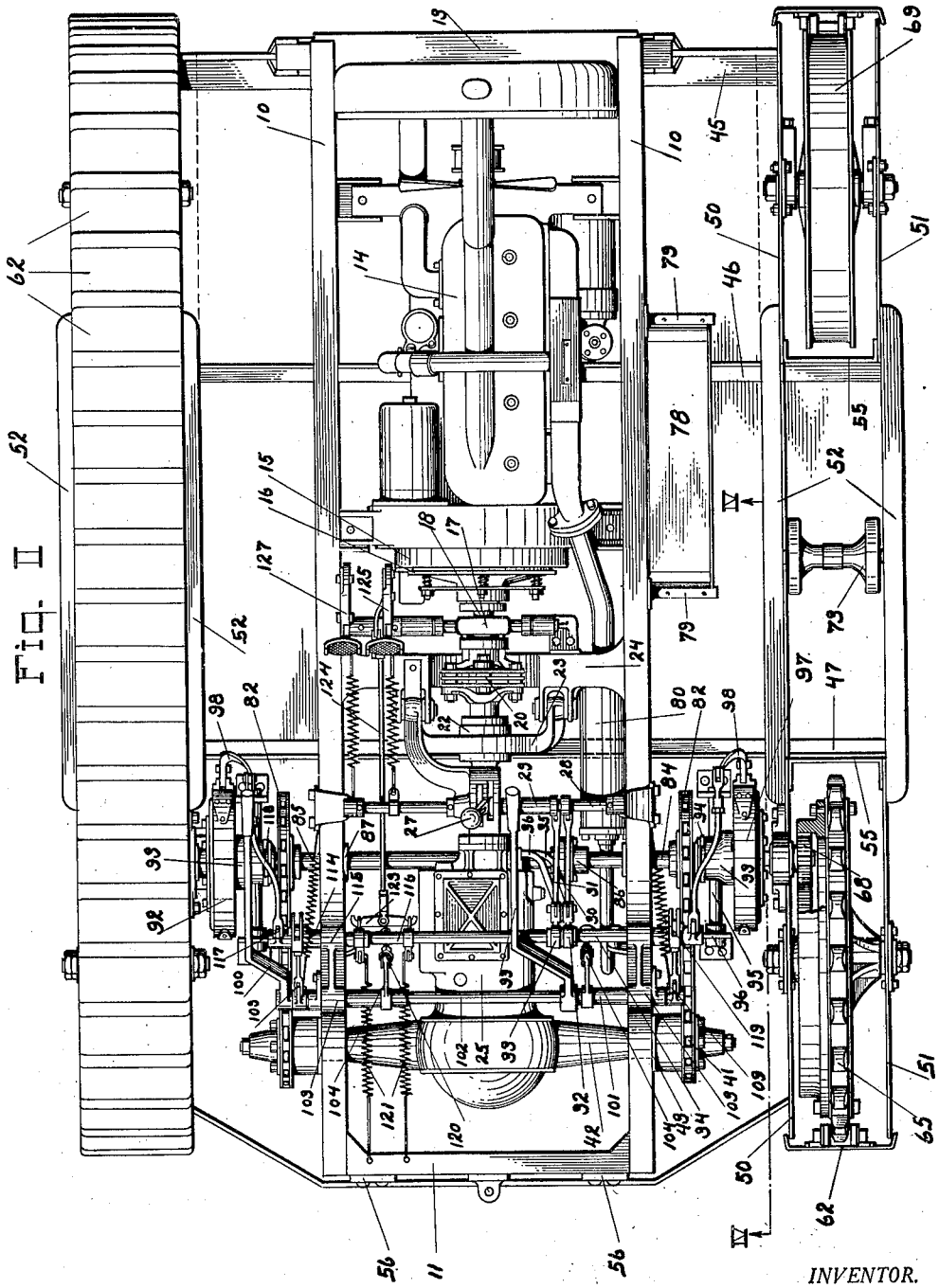

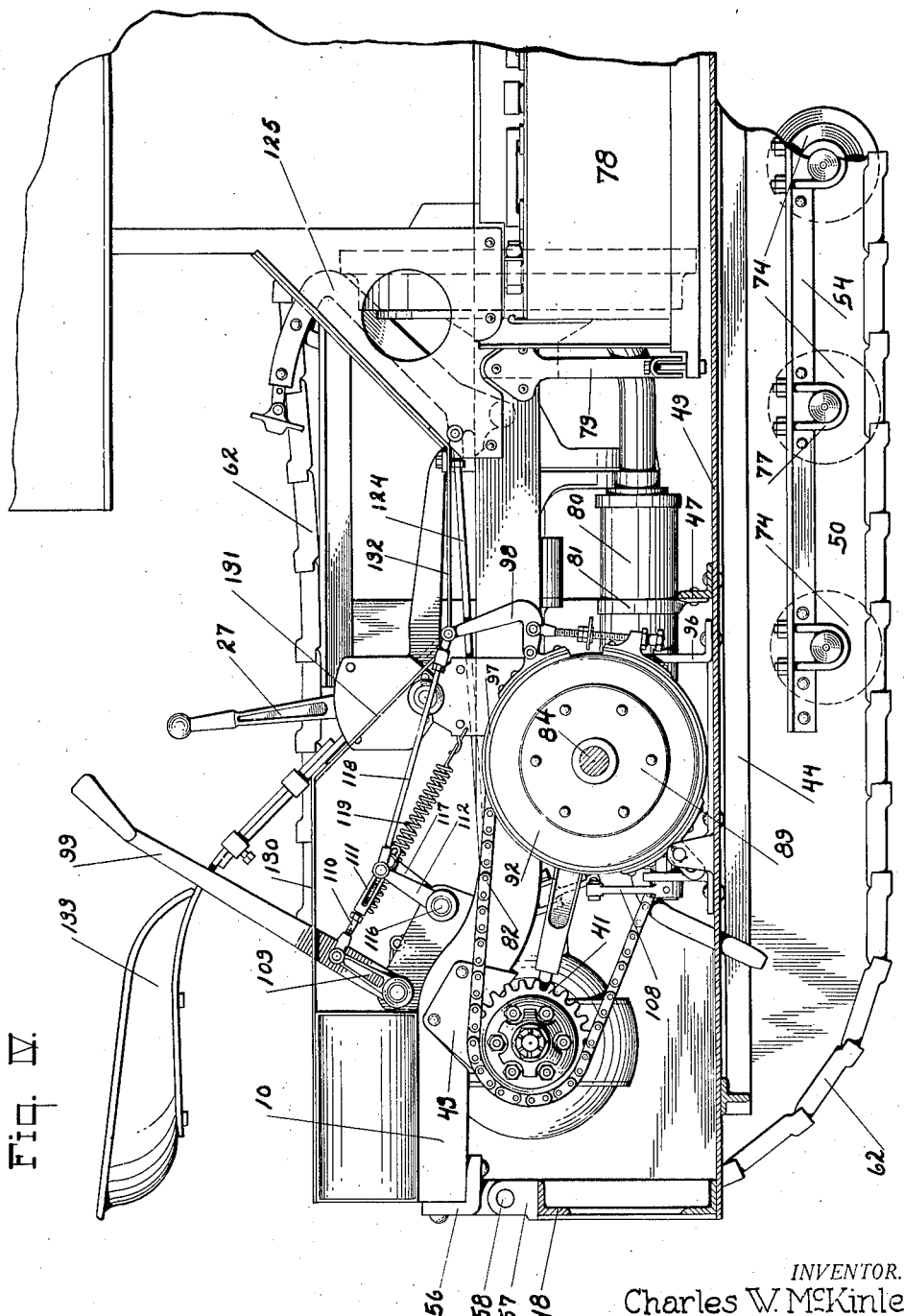

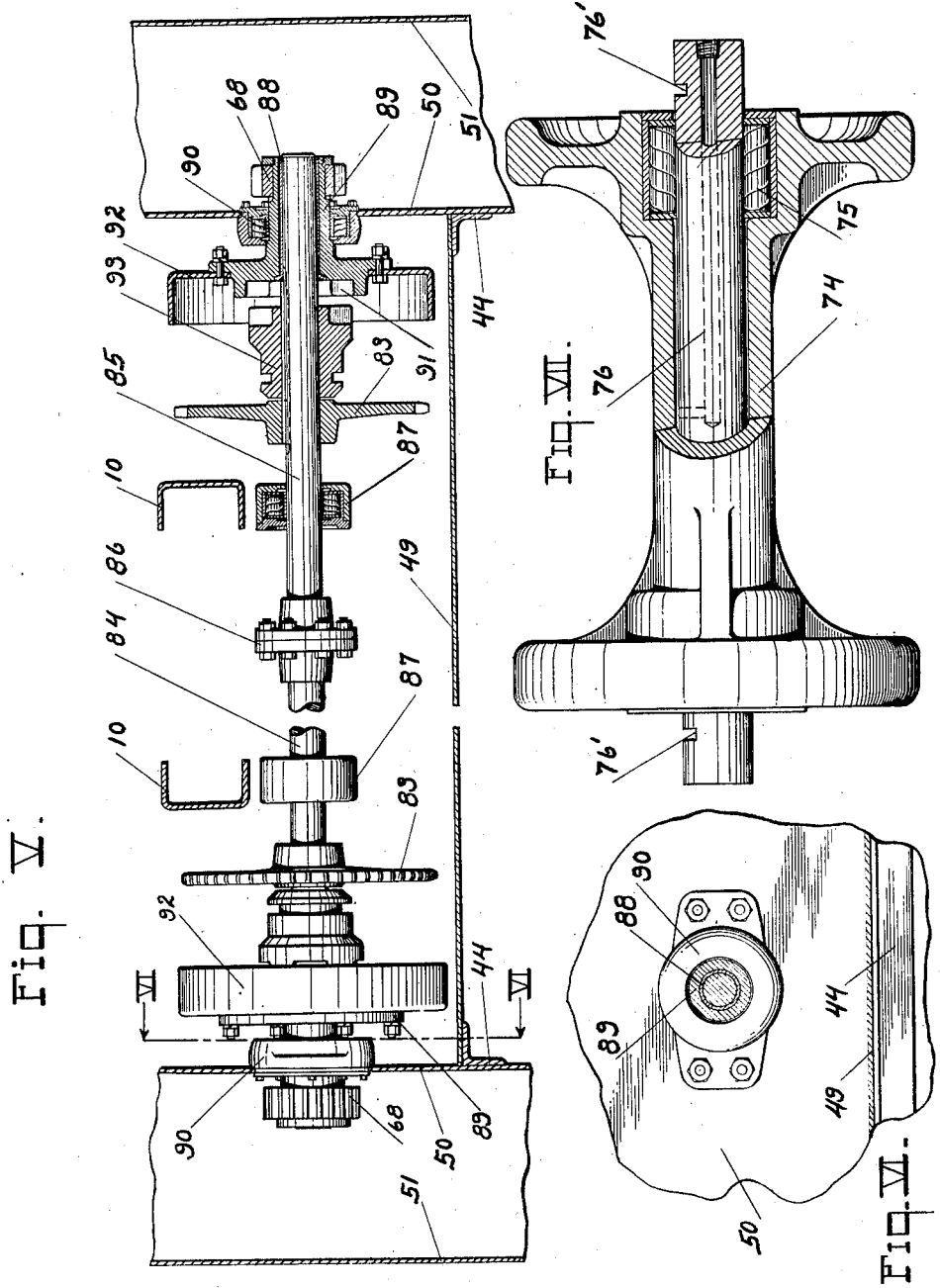

Feb. 16, 1926.
C. W. McKINLEY
TRACTOR
Filed Nov. 22, 1920 9 Sheets-Sheet 6
1,572,943
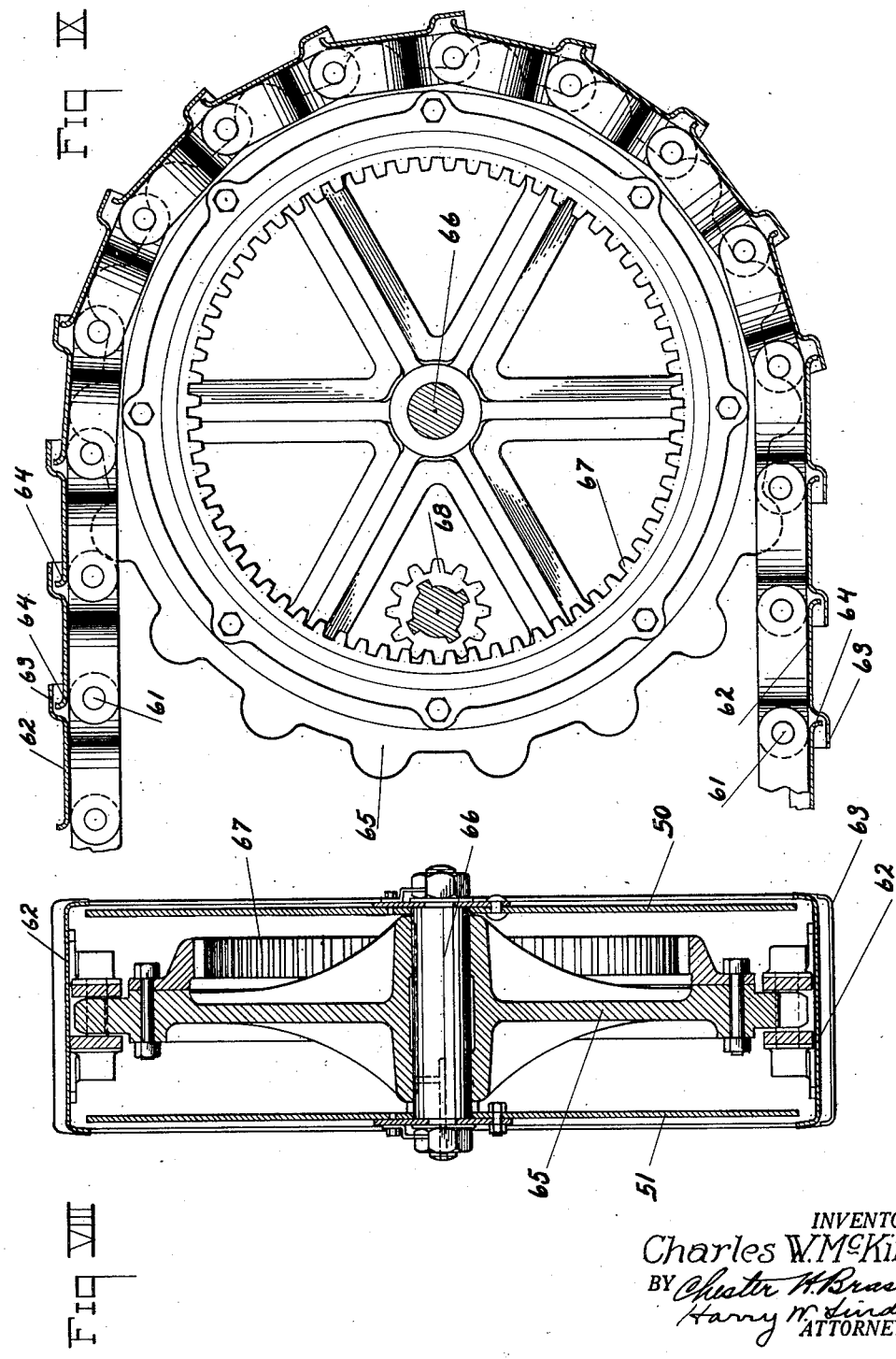
INVENTOR.
Charles W. McKinley
BY Chester H. Braselton
Harry W. Lindsey Jr.
ATTORNEYS

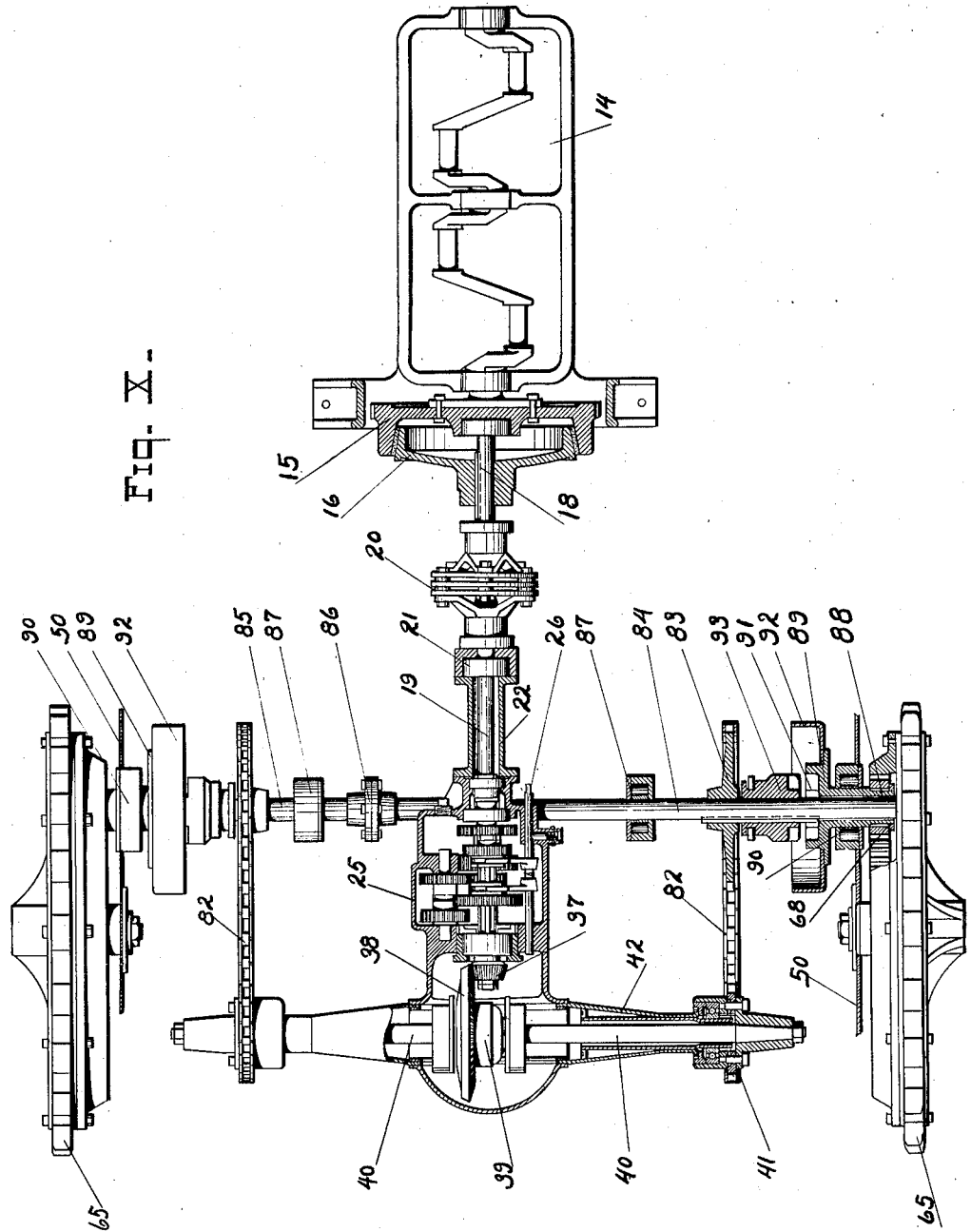

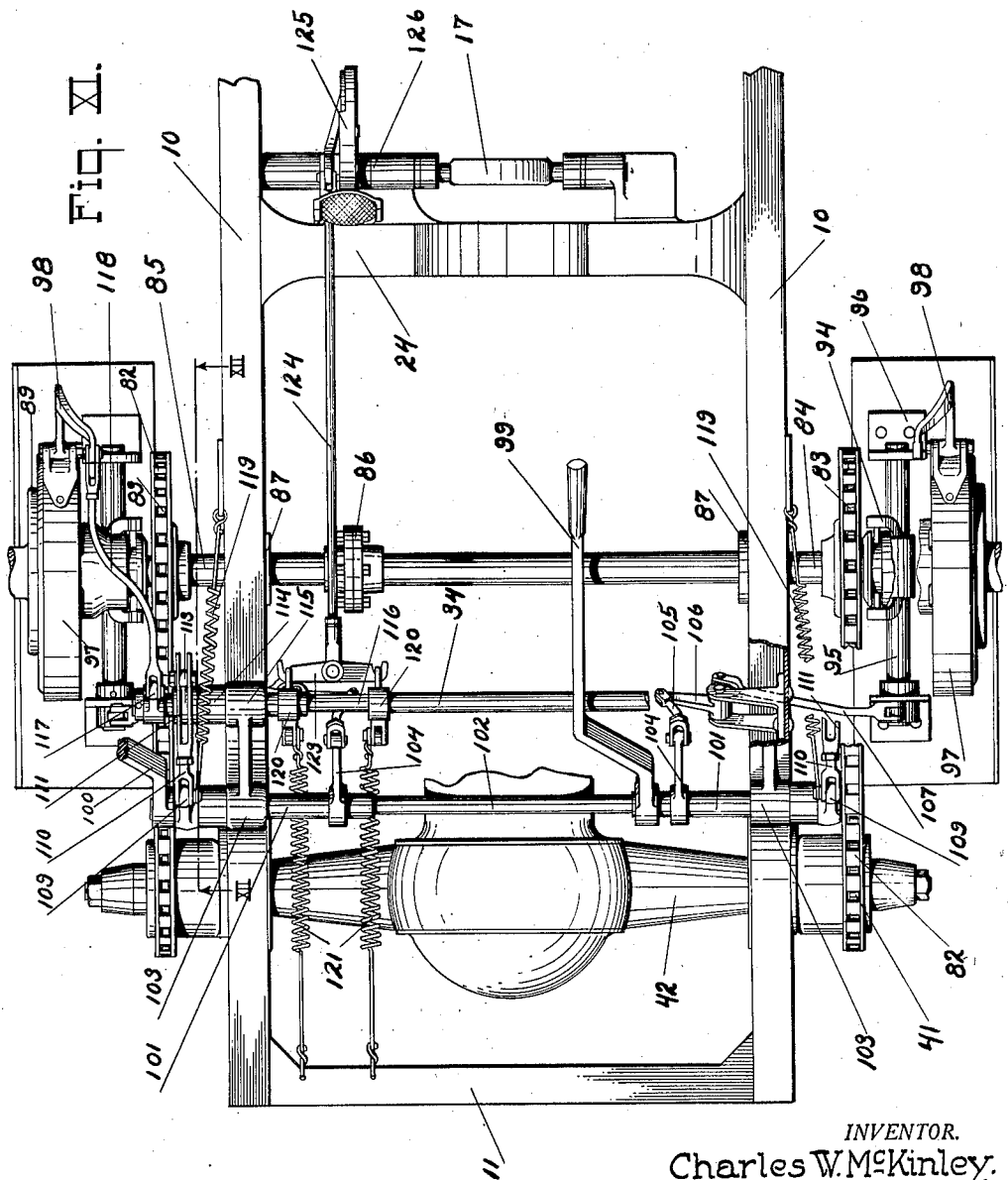

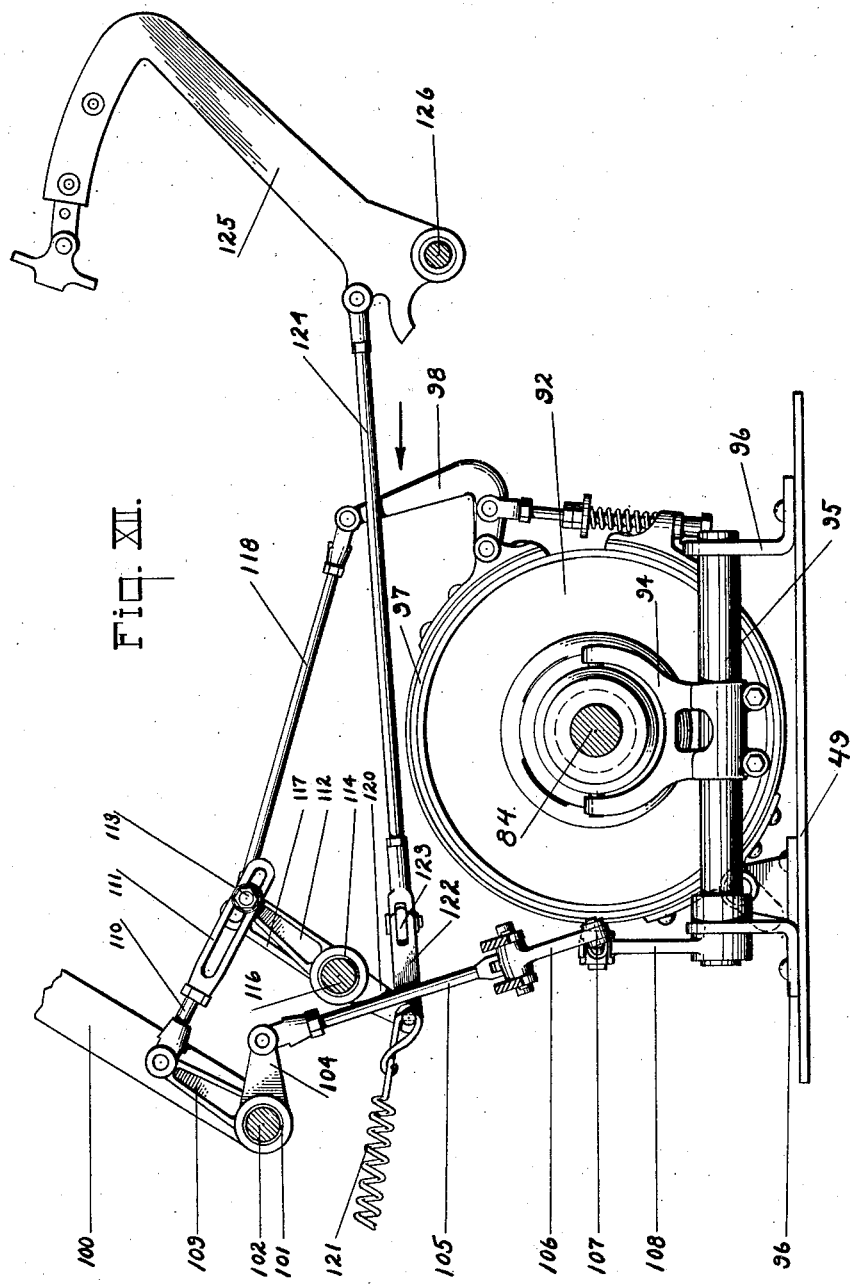

Patented Feb. 16, 1926.

1,572,943

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

TRACTOR.

Application filed November 22, 1920. Serial No. 425,769.

*To all whom it may concern:*

Be it known that I, CHARLES W. McKINLEY, a citizen of the United States, residing at Toledo, in the county of Lucas, State of Ohio, have invented certain new and useful Improvements in Tractors, of which I declare the following to be a full, clear, and exact description.

This invention relates to improvements in tractors, particularly with reference to tractors of the self-laying track type.

It has for one of its objects the provisions of an effective steering means.

Another object is the provision in connection with the steering means of a pair of independently operated brakes and means distinct from the steering means for operating the same brakes simultaneously to effect the stoppage of the vehicle.

Another object of the invention is the provision of a pair of clutches adapted to act independently upon the driving means to the traction members with control means therefor arranged to set each brake as the corresponding clutch is disengaged, but so arranged as to permit the operation of the brakes without affecting the clutches.

Objects relating to details of construction and economies of manufacture, and other objects, will appear as I proceed with the description of that embodiment of the invention, which, for the purposes of the present application, I have illustrated in the accompanying drawings, in which:—

Figure I is a side elevation of a tractor embodying my invention.

Figure II is a plan view, certain of the parts being broken away and others shown in section in order to more clearly illustrate the invention.

Figure III is a vertical elevation of the tractor.

Figure IV is a vertical longitudinal section taken approximately on the line IV—IV Figure II, and showing the rear end only of the tractor.

Figure V is a transverse vertical section, more or less diagrammatic in character, illustrating part of the transmission mechanism.

Figure VI is a detail view taken partly in section on the line VI—VI, Figure V.

Figure VII is a detail view partly in section of one of the link belt sustaining pulleys.

Figure VIII is a vertical transverse section through one of the belt driving wheels.

Figure IX is a vertical section taken at right anges to that of Figure VIII.

Figure X is a somewhat diagrammatic plan view partly in section illustrating the power source and driving connections therefrom.

Figure XI is a plan view with some parts broken away showing the steering control apparatus and service brake.

Figure XII is a detail view of a portion of the steering control mechanism on one side of the vehicle, the view being taken partially on the line XII—XII, Figure XI.

Like reference characters refer to similar parts throughout the views.

The tractor herein illustrated is built in two units which are quite readily separable. One of these consists of a substantially rectangular frame upon which are mounted the engine and the greater part of the transmission mechanism. The other is a much wider frame carrying the traction members, in this case a pair of endless link belts, and also a small part of the transmission mechanism.

The smaller of the two frames is built up of side bars 10, a rear transverse bar 11, and forward transverse bars 12 and 13. It supports an internal combustion engine 14, having a fly wheel 15, a clutch 16, and a clutch shifter 17. The drive shaft, 18 splined to the male member of the clutch, is connected to a propeller shaft 19 through a flexible joint 20 as shown in Figure X. A suitable bearing 21 for the forward end of the shaft 19 is mounted in a casing 22, the forward end of which is carried by a yoke 23 (Figure II) pivotally connected to a traverse brace 24 of the frame. The casing 22 is attached to the gear housing 25 within which is located any suitable change speed and reverse gear mechanism, with a pair of vertically spaced sliding rod gear shifters 26 adapted to be operated selectively by a lever 27 which may be caused to rock either a shaft 28 or a sleeve 29 surrounding the shaft, which are connected by means of links 30 and 31 with vertical levers pivotally supported at 32 and 33 upon a sleeve 34 hereinafter referred to. These vertical levers actuate other links 35 and 36 which are connected to the two sliding rods 26.

Driving force is transmitted through a pair of bevel pinions, 37 and 38, through a differential 39, and thence through shafts 40 to sprocket wheels 41. The rear axle casing 42 is fixed with relation to the inner frame of the vehicle being mounted in brackets 43 which are bolted to and depend from the side bars 10 of the frame.

The larger frame of the vehicle, that is, the frame upon which the traction members are carried, comprises horizontal longitudinal bars 44, a forward transverse bar 45, two intermediate transverse bars 46 and 47 and a rear frame or built up bar 48. It also includes a floor 49, preferably of sheet metal, and inner and outer side plates 50 and 51 on each side, both of which side plates are cut away in the upper central portion. These upper central portions are bridged by horizontal angle bars 52, the latter being braced from the floor 49 by triangular frames 53 also built of angle bars. The lower part of the side plate is reinforced by a horizontal angle bar 54 bolted or otherwise secured to the plate. Vertical channel shaped braces 55 separate and support the side plates.

At the rear, the smaller frame carries a pair of aligned hinge brackets 56 while cooperating brackets 57 are secured to the rear transverse member 48 of the larger frame. A pintle or pintles 58 removably join these hinged elements. Relative motion between the forward ends of the two frames is permitted within certain limits as the connection between these frames at the forward end of the tractor is through a leaf spring 59 secured at the center to the transverse bar 12 of the inner frame and mounted at its ends in shackles 60 riveted to the forward transverse bar 45 of the outer frame.

The traction member consists of chains composed of links joined by rollers 61 and of hard steel tread plates or link covers 62, each of which is formed at one end with an offset portion 63 and at the other end with an outwardly bent flange 64 adapted to be received within the offset portion of the next adjacent plate or cover. The side edges of the plates or covers are both flanged toward the plates 50 and 51 so as to overlap the latter somewhat as shown in Figures II and VIII. Each chain is driven by a sprocket wheel 65 rotatably mounted upon an arbor 66 secured between the side plates 50 and 51 near the rear of the vehicle. To the inner side of each sprocket wheel 65 is bolted as shown in Figure VIII an internal gear 57 with which meshes a pinion 68 by means of which driving force is transmitted to the sprocket wheel. At the forward end of the tractor the traction member rides over an idler 69 which is rotatably mounted upon a spindle 70 adjustable in slots 71 formed in the side plates 50 and 51, the adjustment being effected by means of screws 72, (see Figure I), and being for the purpose of taking up slack in the traction member. The upper run of the traction member is supported at the middle on a pulley 73 mounted in the triangular frame 53. The lower run between the sprocket wheel 65 and the idler 69 is held to the work by a plurality of similar pulleys 74, one of which is shown in detail in Figure VII. These pulleys are mounted by means of roller bearings 75 upon arbors 76. The latter extend through the side plates 50 and 51 and have transverse slots 76' cut into one side for engagement by the vertical webs of the reinforcing angle bars 54, by virtue of which lengthwise movement of the arbors is prevented. They are also firmly mounted by means of U bolts 77 having their ends extending through holes in the horizontal web of the bar 54.

A battery box 78 is suspended upon the outer side of the inner frame by end brackets 79 riveted to one of the side bars 10 of the frame. The engine muffler 80 is shown supported at least partly by the outer frame, being surrounded by a metal belt 81 bolted to the cross bar 47 (Fig. IV).

Steering is effected by exercising separate control for the drive to each of the traction members. The small sprocket wheels 41 on the ends of the axles 40 are connected by chains 82 with sprocket wheels 83, each of which is keyed to a shaft formed of two aligned elements 84 and 85. The ends of these elements are secured together against rotation by a union 86. Each shaft element is mounted in a roller bearing 87 supported in one of the frame members 10 and at its outer end in a bushing 88 carried by and rotatable in a sleeve 89 on the outer end of which is fixed the pinion 68. The sleeve 89 is rotatably mounted in the side plate 50 by means of a roller bearing 90.

At its inner end the sleeve is enlarged and is shaped internally to form the female element 91 of a positive clutch. The sleeve also has bolted thereto a brake drum 92 which will be referred to presently. The male member 93 of the clutch is splined to slide upon the shaft 84, 85 and is adapted to be shifted by a fork 94 (Fig. XII) and secured upon a rocker arm 95 which is supported to turn in bracket 96. A brake band 97 surrounding the drum 92 is adapted to be drawn into braking position by the movement of the lever 98 in the direction of the arrow in Figure XII, as will be apparent from an inspection of that figure.

Either one of the male clutch members 93 may be withdrawn from clutching position by means of the corresponding control lever 99 or 100. The lever 99 is fixed upon a sleeve 101 which is mounted to revolve upon an axle 102 and within a bearing 103 in the frame member 10. A crank 104 is also fixed to the sleeve 101. A link 105 connects this crank with one arm of the bell crank lever 106 pivotally supported by the frame bar 10, the other arm being connected by a link 107 to the upper end of the crank 108 attached to the rock arm 95. Upon the other side of the frame the same reference numerals are applied to similar parts in so far as they appear in the drawing. (Figure XI), but it should be noted that the arrangement of these parts is somewhat different, the lever 100 being attached to the outer end of the sleeve 101 in order to make possible the placing of the driver's seat to one side of the center line of the tractor.

In addition to the crank 104 each sleeve 101 has secured thereto a second crank 109 to which is pivotally connected a link 110 having a forked portion within the two arms of which are formed aligned slots 111. The upper end of the crank 112 extends between these forks and is pivotally and slidably connected thereto by a bolt 113 extending through the crank and through the two slots. This crank is fixed upon a sleeve 34 or 114 as the case may be, the two sleeves being supported in alignment in bearings 115 in the frame bars 10, their inner ends being sustained and kept in alignment by an axle or rod 116 so arranged as to permit relative rotation between the sleeves. Each sleeve 34 or 114 carries a second crank 117 to the end of which is connected a link 118 extending to the upper end of brake operating lever 98. It will therefore be evident that when either one of the levers 99 or 100 is thrown backwardly to release the corresponding clutch the brake upon that side will also be set, but that because of the lost motion connection between the link 110 and the crank 112 the brake may be operated without affecting the clutch operating mechanism. In order to maintain the clutches and clutch operating mechanism normally in operative position spiral springs 119 are attached to the pivots at the ends of cranks 109 and to brackets on the frame members 10 as shown particularly in Figures IV and XI.

The brakes may be operated simultaneously to stop the tractor by the following means: Upon the adjacent ends of sleeves 34 and 114 are fixed cranks 120 which are normally drawn towards the rear by springs 121, thus holding the brakes in inoperative position. To the lower ends of cranks 120 are pivoted links 122 the forward ends of which have separated arms joined by a pin, or are otherwise formed to provide eyes. An equalizing member 123 provided with hooks at its ends for engagement with the said eyes is pivotally connected midway between its ends to a rod 124 adapted to be pulled forwardly by the depression of a foot lever 125 mounted to rock on an arbor 126. Whenever one of the levers 99 or 100 is pulled backwardly the corresponding crank 120 swings forwardly, because of the connections above described, and against the action of its spring 121. This, however, does not affect the rod 124 nor the other brake, the movement being absorbed by the equalizer 123 and the other crank 120 acting in response to its spring 121 in a direction opposite to the brake setting direction. When the operator desires to move the brakes simultaneously for the purpose of stopping the tractor, he merely presses upon the foot pedal to rock both sleeves 34 and crank 120, the pintle bolts 113 sliding in slots 111 and thus not effecting the clutch operating mechanism.

The master clutch 16 between the engine fly wheel and drive shaft is shifted by means of a foot lever 127 (Figure II) which is mechanically connected in such a manner as to move the clutch shifter 17.

As shown in Figure IV a cover formed of sheet metal 130, 131 and 132 conceals and protects the mechanism carried by the rear portion of the inner frame. The driver's seat 133 is mounted on this cover, and preferably upon the inclined portion 131 thereof.

*Operation.*

Assuming that the engine is running and the clutch 16 is permitted to move forward to operative position, power is transmitted to the traction members from engine 14, through shaft 18, flexible joint 20, shaft 19, transmission mechanism, bevel gears 38 and 37, shafts 40, sprocket wheels 41, chains 82, sprocket wheels 83, shafts 84 and 85, clutch members 91 and 93, pinions 68, internal gears 67 and sprocket wheels 65. The tractor is then moving forward if we assume that the gear shift lever 27 is set for one of the forward speeds. Now if the operator desires to steer to the left he pulls backwardly upon the lever 100 thereby retracting the corresponding male clutch member 93, when driving impetus to that side of the machine ceases. This movement of the lever 100 also acts through the lost motion connection heretofore described to run the left sleeve 114, causing the setting of the brake on that side. Power is then transmitted through movement of the shafts 40, chains 82 and shaft 84, 85 to the pinion 68 and internal gear 67 on the right only, with the result that that side of the machine moves forward while the left side stands still, and hence a turn to the left is effected. Pulling of the lever 99 causes the tractor to move to the right by declutching the drive means on that side and applying the brake. Both brakes may be operated simultaneously without effect upon the steering clutches by depression of the foot lever 125 to rock both of the sleeves 34 and 114, thereby setting the two brake bands through the cranks 117, links 118 and levers 98.

While I have shown and described in considerable detail a specific embodiment of my invention, it is to be understood that this showing and description is illustrative only and for the purpose of rendering my invention clear, and that I do not regard the invention as limited to the details of construction illustrated or described, nor any of them, except in so far as I have included such limitations within the terms of the following claims, in which it is my intention to claim all novelty inherent in my invention broadly as well as specifically.

Having thus described my invention, what I claim as new and desire to secure by Letters Patent is:

1. In a motor vehicle, a power source, a traction member on either side of the vehicle, a separate clutch adapted to connect either of said traction member to the power source, a pair of independently movable transverse rock shafts adapted to operate said clutches, a brake for each traction member, a second pair of independently movable shafts adapted to operate said brakes and a connection between each of the first pair of rock shafts and one of the second pair of rock shafts.

2. In a motor vehicle, a power source, a traction member on either side of the vehicle, a separate clutch adapted to connect either of said traction members with the power source, a pair of independently movable transverse rock shafts adapted to operate said clutches, a brake for each traction member, a second pair of independently movable rock shafts adapted to operate said brakes, and a lost motion connection between each of the first pair of rock shafts and one of the second pair of rock shafts causing the shaft of the second pair to rock when the shaft of the first pair is rocked, but permitting the independent rocking of the shaft of the second pair.

3. In a motor vehicle, a power source, a traction member on either side of the vehicle, a separate clutch adapted to connect either of said traction members with the power source, a pair of independently movable transverse rock shafts adapted to operate said clutches, a brake for each traction member, a second pair of independently movable rock shafts adapted to operate said brakes and a lost motion connection between each of the first pair of rock shafts and one of the second pair of rock shafts causing the shafts of the second pair to rock when the shaft of the first pair is rocked, but permitting the independent rocking of the shaft of the second pair, and further means for rocking the shafts of said second pair.

4. In a motor vehicle, a power source, a traction member on either side of the vehicle, a separate clutch adapted to connect either of said traction members with the power source, a pair of independently movable transverse rock shafts adapted to operate said clutch, a brake for each traction member, a second pair of independently movable rock shafts adapted to operate said brakes, and a lost motion connection between each of the first pair of rock shafts and one of the second pair of rock shafts causing the shaft of the second pair to rock when the shaft of the first pair is rocked, but permitting the independent rocking of the shaft of the second pair, and further means for rocking both of the shafts of said second pair, simultaneously.

In testimony whereof, I affix my signature.

CHARLES W. McKINLEY.